US010330011B2

(12) United States Patent
Chuong et al.

(10) Patent No.: US 10,330,011 B2
(45) Date of Patent: Jun. 25, 2019

(54) BENCH AFT SUB-ASSEMBLY FOR TURBINE EXHAUST CASE FAIRING

(71) Applicant: United Technologies Corporation, Hartford, CT (US)

(72) Inventors: Conway Chuong, Manchester, CT (US); Jason David Liles, Port Saint Lucie, FL (US); Jonathan Ariel Scott, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 183 days.

(21) Appl. No.: 14/773,807

(22) PCT Filed: Mar. 11, 2014

(86) PCT No.: PCT/US2014/023065
§ 371 (c)(1),
(2) Date: Sep. 9, 2015

(87) PCT Pub. No.: WO2014/197037
PCT Pub. Date: Dec. 11, 2014

(65) Prior Publication Data
US 2016/0017807 A1 Jan. 21, 2016

Related U.S. Application Data

(60) Provisional application No. 61/776,311, filed on Mar. 11, 2013.

(51) Int. Cl.
F01D 25/30 (2006.01)
F01D 25/24 (2006.01)
(Continued)

(52) U.S. Cl.
CPC .............. F02C 7/20 (2013.01); F01D 25/162 (2013.01); F01D 25/246 (2013.01); F01D 25/30 (2013.01);
(Continued)

(58) Field of Classification Search
CPC ..... F02K 1/04; F02K 1/78; F02K 1/80; F02K 1/82; F01D 25/16; F01D 25/243;
(Continued)

(56) References Cited

U.S. PATENT DOCUMENTS 2,214,108 A 7/1938 Grece
2,579,619 A * 12/1951 Scott ........................ F02K 1/80
285/114

(Continued)

FOREIGN PATENT DOCUMENTS

EP 19852603 A1 5/2000
WO WO 03/020469 A1 3/2003
(Continued)

OTHER PUBLICATIONS

Extended European Search Report for EP Application 14807208.5, dated Nov. 17, 2016, 7 Pages.
(Continued)

Primary Examiner — Todd E Manahan
Assistant Examiner — Eric W Linderman
(74) Attorney, Agent, or Firm — Kinney & Lange, P.A.

(57) ABSTRACT

A fairing sub-assembly 88 for a turbine frame comprises an inner ring 50, an outer ring 48 and a plurality of strut-shells. The inner ring is formed of a plurality of inner segments 82. The outer ring is formed of a plurality of outer segments 80. The plurality of strut-shells 84, 86 connecting the inner ring 48 and the outer ring 50. In another embodiment, the fairing sub-assembly comprises an inner band 45 joining the plurality of inner segments 82 and the plurality of strut-shells 86

(Continued)

to form outer slots, and an outer band 44 joining the plurality of outer segments 80 and the plurality of strut-shells 86 to form inner slots. A method of assembling a fairing 46 comprises inserting the aforementioned fairing sub-assembly 38 into an aft end of a turbine frame 42, inserting a plurality of forward strut-shells 84 into the outer and inner slots at a forward end of the turbine frame 42, and joining the forward strut-shells 84 to the fairing sub-assembly 88.

19 Claims, 11 Drawing Sheets

(51) Int. Cl.
*F01D 25/16* (2006.01)
*F02C 7/20* (2006.01)
(52) U.S. Cl.
CPC .... *F05D 2220/32* (2013.01); *F05D 2230/232* (2013.01); *F05D 2230/50* (2013.01); *F05D 2240/90* (2013.01)
(58) Field of Classification Search
CPC ...... F01D 25/246; F01D 25/162; F01D 25/30; F02C 7/20
See application file for complete search history.

(56) References Cited

U.S. PATENT DOCUMENTS

| | | | | |
|---|---|---|---|---|
| 2,640,317 A | * | 6/1953 | Fentress | F02K 1/80 285/300 |
| 2,809,057 A | * | 10/1957 | McEachern | F02K 1/80 285/187 |
| 2,914,912 A | * | 12/1959 | Woll | F02K 3/10 60/265 |
| 2,938,336 A | * | 5/1960 | Peterson | F01D 9/065 60/39.5 |
| 2,941,781 A | * | 6/1960 | Boyum | F01D 25/162 415/142 |
| 3,367,108 A | * | 2/1968 | Camboulive | F02K 1/80 285/146.1 |
| 3,371,482 A | * | 3/1968 | Camboulive | F02C 7/232 60/39.094 |
| 3,576,328 A | | 4/1971 | Vose | |
| 3,802,046 A | | 4/1974 | Wachtell et al. | |
| 3,970,319 A | | 7/1976 | Carroll et al. | |
| 4,009,569 A | | 3/1977 | Kozlin | |
| 4,044,555 A | | 4/1977 | McLoughlin et al. | |
| 4,088,422 A | | 5/1978 | Martin | |
| 4,114,248 A | | 9/1978 | Smith et al. | |
| 4,305,697 A | * | 12/1981 | Cohen | B23P 6/005 29/402.13 |
| 4,321,007 A | * | 3/1982 | Dennison | F01D 25/162 415/142 |
| 4,369,016 A | * | 1/1983 | Dennison | F01D 25/162 415/142 |
| 4,438,626 A | * | 3/1984 | Berestecki | F02K 1/04 60/749 |
| 4,478,551 A | * | 10/1984 | Honeycutt, Jr. | F01D 25/162 415/139 |
| 4,645,217 A | | 2/1987 | Honeycutt, Jr. et al. | |
| 4,678,113 A | | 7/1987 | Bridges et al. | |
| 4,738,453 A | | 4/1988 | Ide | |
| 4,756,536 A | | 7/1988 | Belcher | |
| 4,793,770 A | | 12/1988 | Schonewald et al. | |
| 4,798,048 A | * | 1/1989 | Clements | F02K 1/04 60/39.826 |
| 4,920,742 A | * | 5/1990 | Nash | F01D 25/162 415/116 |
| 4,987,736 A | | 1/1991 | Ciokajlo et al. | |
| 4,989,406 A | | 2/1991 | Vdoviak et al. | |
| 4,993,918 A | * | 2/1991 | Myers | F01D 25/162 415/191 |
| 5,020,318 A | * | 6/1991 | Vdoviak | F01D 9/065 60/226.1 |
| 5,031,922 A | | 7/1991 | Heydrich | |
| 5,042,823 A | | 8/1991 | Mackay et al. | |
| 5,071,138 A | | 12/1991 | Mackay et al. | |
| 5,076,049 A | | 12/1991 | VonBenken et al. | |
| 5,100,158 A | | 3/1992 | Gardner | |
| 5,108,116 A | | 4/1992 | Johnson et al. | |
| 5,160,251 A | * | 11/1992 | Ciokajlo | F01D 25/162 415/142 |
| 5,161,947 A | * | 11/1992 | Eckfeldt | F02C 7/20 415/142 |
| 5,169,159 A | | 12/1992 | Pope et al. | |
| 5,174,584 A | | 12/1992 | Lahrman | |
| 5,188,507 A | | 2/1993 | Sweeney | |
| 5,211,541 A | | 5/1993 | Fledderjohn et al. | |
| 5,236,302 A | | 8/1993 | Weisgerber et al. | |
| 5,246,295 A | | 9/1993 | Ide | |
| 5,265,807 A | | 11/1993 | Steckbeck et al. | |
| 5,269,057 A | | 12/1993 | Mendham | |
| 5,272,869 A | | 12/1993 | Dawson et al. | |
| 5,273,397 A | | 12/1993 | Czachor et al. | |
| 5,292,227 A | * | 3/1994 | Czachor | F01D 25/162 415/142 |
| 5,312,227 A | | 5/1994 | Grateau et al. | |
| 5,338,154 A | | 8/1994 | Meade et al. | |
| 5,357,744 A | * | 10/1994 | Czachor | F01D 9/065 415/134 |
| 5,370,402 A | | 12/1994 | Gardner et al. | |
| 5,385,015 A | * | 1/1995 | Clements | F23R 3/20 60/39.826 |
| 5,385,409 A | | 1/1995 | Ide | |
| 5,401,036 A | | 3/1995 | Basu | |
| 5,438,756 A | * | 8/1995 | Halchak | F01D 25/162 29/889.2 |
| 5,474,305 A | | 12/1995 | Flower | |
| 5,483,792 A | * | 1/1996 | Czachor | F01D 25/162 60/796 |
| 5,558,341 A | | 9/1996 | McNickle et al. | |
| 5,597,286 A | | 1/1997 | Dawson et al. | |
| 5,605,438 A | | 2/1997 | Burdgick et al. | |
| 5,609,467 A | * | 3/1997 | Lenhart | F01D 9/065 415/142 |
| 5,632,493 A | | 5/1997 | Gardner | |
| 5,634,767 A | | 6/1997 | Dawson | |
| 5,691,279 A | | 11/1997 | Tauber et al. | |
| 5,755,445 A | | 5/1998 | Arora | |
| 5,851,105 A | | 12/1998 | Fric et al. | |
| 5,911,400 A | | 6/1999 | Niethammer et al. | |
| 6,163,959 A | * | 12/2000 | Arraitz | F01D 9/065 29/889.1 |
| 6,196,550 B1 | | 3/2001 | Arora et al. | |
| 6,227,800 B1 | | 5/2001 | Spring et al. | |
| 6,337,751 B1 | | 1/2002 | Kimizuka | |
| 6,343,912 B1 | | 2/2002 | Mangeiga et al. | |
| 6,358,001 B1 | * | 3/2002 | Bosel | F01D 25/24 411/178 |
| 6,364,316 B1 | | 4/2002 | Arora | |
| 6,439,841 B1 | * | 8/2002 | Bosel | F01D 9/065 415/142 |
| 6,511,284 B2 | | 1/2003 | Darnell et al. | |
| 6,578,363 B2 | | 6/2003 | Hashimoto et al. | |
| 6,601,853 B2 | | 8/2003 | Inoue | |
| 6,612,807 B2 | | 9/2003 | Czachor | |
| 6,619,030 B1 | | 9/2003 | Seda et al. | |
| 6,638,013 B2 | * | 10/2003 | Nguyen | F01D 25/14 415/115 |
| 6,652,229 B2 | | 11/2003 | Lu | |
| 6,672,833 B2 | | 1/2004 | MacLean et al. | |
| 6,719,524 B2 | | 4/2004 | Nguyen et al. | |
| 6,736,401 B2 | | 5/2004 | Chung et al. | |
| 6,792,758 B2 | | 9/2004 | Dowman | |
| 6,796,765 B2 | | 9/2004 | Kosel et al. | |
| 6,805,356 B2 | | 10/2004 | Inoue | |
| 6,811,154 B2 | | 11/2004 | Proctor et al. | |
| 6,860,716 B2 | * | 3/2005 | Czachor | F01D 25/162 415/142 |
| 6,935,631 B2 | | 8/2005 | Inoue | |

(56) References Cited

U.S. PATENT DOCUMENTS

| | | | |
|---|---|---|---|
| 6,942,452 B2* | 9/2005 | Bruno | F01D 9/065 16/2.2 |
| 6,969,826 B2 | 11/2005 | Trewiler et al. | |
| 6,983,601 B2* | 1/2006 | Koshoffer | F02K 3/10 60/761 |
| 6,983,608 B2 | 1/2006 | Allen, Jr. et al. | |
| 7,055,305 B2 | 6/2006 | Baxter et al. | |
| 7,094,026 B2 | 8/2006 | Coign et al. | |
| 7,100,358 B2 | 9/2006 | Gekht et al. | |
| 7,200,933 B2* | 4/2007 | Lundgren | B23P 15/04 15/4 |
| 7,229,249 B2 | 6/2007 | Durocher et al. | |
| 7,238,008 B2 | 7/2007 | Bobo et al. | |
| 7,367,567 B2 | 5/2008 | Farah et al. | |
| 7,371,044 B2 | 5/2008 | Nereim | |
| 7,389,583 B2 | 6/2008 | Lundgren | |
| 7,614,150 B2* | 11/2009 | Lundgren | B23K 26/24 29/889.21 |
| 7,631,879 B2 | 12/2009 | Diantonio | |
| 7,673,461 B2 | 3/2010 | Cameriano et al. | |
| 7,677,047 B2 | 3/2010 | Somanath et al. | |
| 7,735,833 B2* | 6/2010 | Braun et al. | |
| 7,798,765 B2* | 9/2010 | Snyder | F01D 25/26 415/1 |
| 7,798,768 B2 | 9/2010 | Strain et al. | |
| 7,815,417 B2 | 10/2010 | Somanath et al. | |
| 7,824,152 B2 | 11/2010 | Morrison | |
| 7,891,165 B2 | 2/2011 | Bader et al. | |
| 7,909,573 B2 | 3/2011 | Cameriano et al. | |
| 7,955,446 B2 | 6/2011 | Dierberger | |
| 7,959,409 B2 | 6/2011 | Guo et al. | |
| 7,988,799 B2 | 8/2011 | Dierberger | |
| 8,069,648 B2 | 12/2011 | Snyder et al. | |
| 8,083,465 B2 | 12/2011 | Herbst et al. | |
| 8,091,371 B2 | 1/2012 | Durocher et al. | |
| 8,092,161 B2 | 1/2012 | Cai et al. | |
| 8,152,451 B2 | 4/2012 | Manteiga et al. | |
| 8,162,593 B2 | 4/2012 | Guimbard et al. | |
| 8,172,526 B2* | 5/2012 | Lescure | F01D 11/005 415/213.1 |
| 8,177,488 B2* | 5/2012 | Manteiga | F01D 9/065 415/108 |
| 8,221,071 B2 | 7/2012 | Wojno et al. | |
| 8,245,399 B2 | 8/2012 | Anantharaman et al. | |
| 8,245,518 B2 | 8/2012 | Durocher et al. | |
| 8,282,342 B2 | 10/2012 | Tonks et al. | |
| 8,371,127 B2 | 2/2013 | Durocher et al. | |
| 8,371,812 B2 | 2/2013 | Manteiga et al. | |
| 8,616,835 B2* | 12/2013 | Hashimoto | F01D 9/065 415/142 |
| 9,163,525 B2* | 10/2015 | Alexander | F01D 25/00 |
| 2003/0025274 A1 | 2/2003 | Allan et al. | |
| 2003/0042682 A1 | 3/2003 | Inoue | |
| 2003/0062684 A1 | 4/2003 | Inoue | |
| 2003/0062685 A1 | 4/2003 | Inoue | |
| 2003/0161716 A1 | 8/2003 | Nguyen et al. | |
| 2004/0103534 A1* | 6/2004 | Lundgren | B23P 15/04 29/889.22 |
| 2005/0022501 A1* | 2/2005 | Eleftheriou | F01D 5/22 60/226.1 |
| 2005/0046113 A1 | 3/2005 | Inoue | |
| 2005/0132715 A1 | 6/2005 | Allen, Jr. et al. | |
| 2006/0010852 A1 | 1/2006 | Gekht et al. | |
| 2007/0241257 A1* | 10/2007 | Eleftheriou | F01D 25/162 248/554 |
| 2008/0060344 A1* | 3/2008 | Durocher | F02K 1/04 60/262 |
| 2008/0216300 A1 | 9/2008 | Anderson et al. | |
| 2009/0110548 A1* | 4/2009 | Durocher | F01D 11/001 415/173.4 |
| 2009/0126190 A1* | 5/2009 | Grzondziel | B22D 25/02 29/888 |
| 2009/0142182 A1 | 6/2009 | Kapustka | |
| 2010/0132369 A1* | 6/2010 | Durocher | F01D 9/065 60/796 |
| 2010/0132370 A1* | 6/2010 | Durocher | F01D 25/162 60/796 |
| 2010/0132371 A1* | 6/2010 | Durocher | F01D 9/065 60/796 |
| 2010/0132372 A1* | 6/2010 | Durocher | F01D 9/065 60/796 |
| 2010/0132374 A1* | 6/2010 | Manteiga | F01D 9/02 60/796 |
| 2010/0132376 A1* | 6/2010 | Durocher | F01D 9/065 60/797 |
| 2010/0132377 A1 | 6/2010 | Durocher et al. | |
| 2010/0135770 A1* | 6/2010 | Durocher | F01D 9/065 415/69 |
| 2010/0135777 A1* | 6/2010 | Manteiga | F01D 9/02 415/190 |
| 2010/0202872 A1 | 8/2010 | Weidmann | |
| 2010/0207379 A1* | 8/2010 | Olver | F16L 23/167 285/13 |
| 2010/0236244 A1 | 9/2010 | Longardner | |
| 2010/0275572 A1* | 11/2010 | Durocher | F01D 9/065 60/39.08 |
| 2010/0275614 A1* | 11/2010 | Fontaine | F01D 25/162 60/797 |
| 2010/0307165 A1 | 12/2010 | Wong et al. | |
| 2011/0000223 A1* | 1/2011 | Russberg | F01D 9/041 60/796 |
| 2011/0005234 A1 | 1/2011 | Hashimoto et al. | |
| 2011/0061767 A1 | 3/2011 | Vontell et al. | |
| 2011/0073745 A1* | 3/2011 | Duchatelle | F01D 9/04 248/637 |
| 2011/0079020 A1* | 4/2011 | Durocher | F02C 7/28 60/799 |
| 2011/0081237 A1* | 4/2011 | Durocher | F01D 9/06 415/173.1 |
| 2011/0081239 A1 | 4/2011 | Durocher | |
| 2011/0081240 A1 | 4/2011 | Durocher et al. | |
| 2011/0085895 A1 | 4/2011 | Durocher et al. | |
| 2011/0214433 A1 | 9/2011 | Feindel et al. | |
| 2011/0262277 A1 | 10/2011 | Sjoqvist et al. | |
| 2011/0302929 A1* | 12/2011 | Bruhwiler | F01D 9/044 60/796 |
| 2012/0111023 A1 | 5/2012 | Sjoqvist et al. | |
| 2012/0156020 A1 | 6/2012 | Kottilingam et al. | |
| 2012/0186254 A1 | 7/2012 | Ito et al. | |
| 2012/0204569 A1* | 8/2012 | Schubert | F01D 25/30 60/772 |
| 2013/0011242 A1 | 1/2013 | Beeck et al. | |
| 2013/0084166 A1* | 4/2013 | Klingels | F01D 11/005 415/173.1 |
| 2014/0003922 A1* | 1/2014 | Daniels | F01D 25/24 415/182.1 |
| 2014/0013771 A1* | 1/2014 | Farah | F02C 7/20 60/797 |
| 2014/0174088 A1* | 6/2014 | Ruberte Sanchez | F02K 3/10 60/722 |
| 2014/0186167 A1* | 7/2014 | Liles | F01D 25/162 415/182.1 |
| 2014/0248152 A1* | 9/2014 | Chuong | F01D 25/162 416/95 |
| 2014/0373556 A1* | 12/2014 | Aronsson | F01D 25/162 60/796 |
| 2015/0083822 A1* | 3/2015 | Mecuson | F01D 25/162 239/265.11 |
| 2015/0143810 A1* | 5/2015 | Salunkhe | F01D 25/30 60/772 |
| 2015/0337687 A1* | 11/2015 | Scott | F02C 7/20 415/215.1 |
| 2015/0345330 A1* | 12/2015 | Budnick | F01D 25/162 415/177 |
| 2015/0345334 A1* | 12/2015 | Scott | F01D 25/30 415/213.1 |
| 2015/0345338 A1* | 12/2015 | Yeager | F01D 25/162 415/177 |

(56) References Cited

U.S. PATENT DOCUMENTS

| | | | | |
|---|---|---|---|---|
| 2015/0345400 A1* | 12/2015 | Scott | ............... | F01D 9/065 |
| | | | | 60/796 |
| 2015/0354410 A1* | 12/2015 | Budnick | ............... | F01D 25/28 |
| | | | | 415/177 |
| 2017/0067369 A1* | 3/2017 | Hashimoto | ............ | F01D 25/162 |
| 2017/0107856 A1* | 4/2017 | Lefebvre | ............... | F01D 25/246 |
| 2017/0130608 A1* | 5/2017 | Wiebe | ............... | F01D 9/065 |
| 2017/0138264 A1* | 5/2017 | Tham | ............... | F02C 7/18 |

FOREIGN PATENT DOCUMENTS

| | | |
|---|---|---|
| WO | WO 2006/007686 A1 | 1/2006 |
| WO | WO 2009/157817 A1 | 12/2009 |
| WO | WO 2010/002295 A1 | 1/2010 |
| WO | WO 2012/158070 A1 | 11/2012 |
| WO | WO2014105530 A1 | 7/2014 |

OTHER PUBLICATIONS

International Search Report and Written Opinion from PCT Application Serial No. PCT/US2014/023065, dated Dec. 22, 2014, 12 pages.

Communication Pursuant to Article 94(3) EPC for EP Application 14807208.5, dated Nov. 23, 2019, 5 Pages.

\* cited by examiner

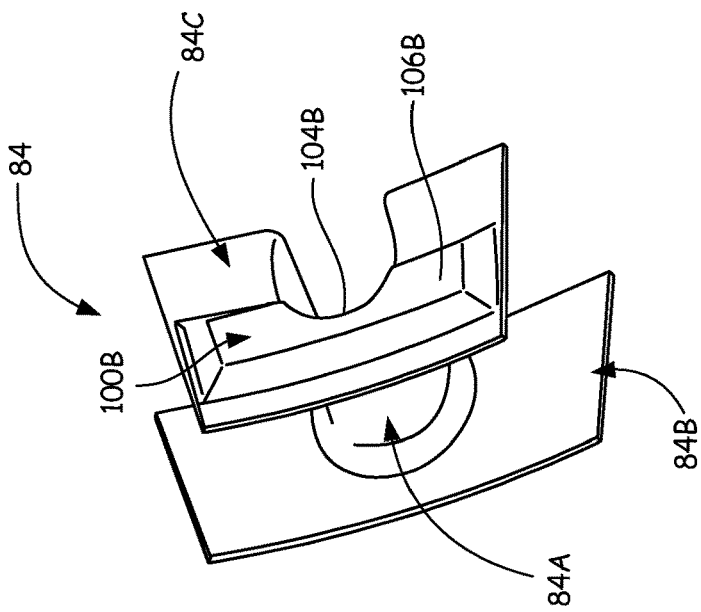
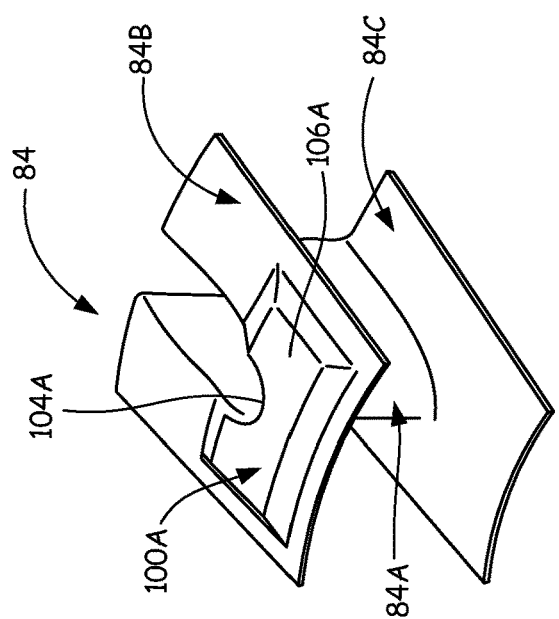
FIG. 9B
FIG. 9A

BENCH AFT SUB-ASSEMBLY FOR TURBINE EXHAUST CASE FAIRING

BACKGROUND

The present disclosure relates generally to gas turbine engine exhaust cases. More particularly, the present disclosure relates to design and construction of fairings that fit around and protect ring-strut-ring structures.

Turbine Exhaust Cases (TEC) typically comprise structural frames that support the very aft end of a gas turbine engine. In aircraft applications, the TEC can be utilized to mount the engine to the aircraft airframe. In industrial gas turbine applications, the TEC can be utilized to couple the gas turbine engine to an electrical generator. A typical TEC comprises an outer ring that couples to the outer diameter case of the low pressure turbine, an inner ring that surrounds the engine centerline so as to support shafting in the engine, and a plurality of struts connecting the inner and outer rings. As such, the TEC is typically subject to various types of loading, thereby requiring the TEC to be structurally strong and rigid. Due to the placement of the TEC within the hot gas stream exhausted from the turbines of the gas turbine engine, it is typically desirable to shield the TEC structural frame with a fairing that is able to withstand direct impingement of the hot gas stream. The fairing additionally takes on a ring-strut-ring configuration wherein the struts are hollow to surround the frame struts. The structural frame and the fairing can each be optimized for their respective functions, such as load bearing and temperature capabilities.

Conventionally, manufacture of a TEC has involved casting the ring-strut-ring frame as a single piece and separately producing a ring-strut-ring fairing. Typically, the frame is separated into a plurality of pieces, reassembled in-place with the fairing, and welded or bolted back together. Historically, it has been simpler to reassemble the frame within the fairing in order to protect the structural and aerodynamic integrity of the fairing. However, separating the frame into pieces inherently produces structural weaknesses that may degrade performance. There is, therefore, a need for improved manufacturing and assembly processes for turbine exhaust cases.

SUMMARY

The present disclosure is directed to a fairing sub-assembly for a turbine frame. The fairing sub-assembly comprises an inner ring, an outer ring and a plurality of strut and shroud segments. The inner ring is formed by a plurality of inner segments. The outer ring is formed by a plurality of outer segments. The plurality of strut and shroud segments connect the inner ring and the outer ring. The fairing sub-assembly may further comprise an inner band joining the plurality of inner segments and the plurality of strut and shroud segments to form outer slots, and an outer band joining the plurality of outer segments and the plurality of strut and shroud segments to form inner slots.

A method of assembling a fairing for a turbine frame comprises joining a plurality of inner shroud segments and a plurality of outer shroud segments to a plurality of struts. The plurality of inner shroud segments are joined to outer portions of a plurality of strut shells. The plurality of outer shroud segments are joined to inner portions of the plurality of strut shells. The method may further comprise joining the plurality of inner shroud segments to an inner band, joining the plurality of outer shroud segments to an outer band, and joining the plurality of strut shells to the inner and outer bands.

BRIEF DESCRIPTION OF THE DRAWINGS

FIG. 9A is a perspective view of an outer end of a leading edge fairing strut shell showing a stiffening pad on a forward shroud half.

FIG. 9B is a perspective view of an inner end of a leading edge fairing strut shell showing a stiffening pad on a forward shroud half.

DETAILED DESCRIPTION

Figure 1:
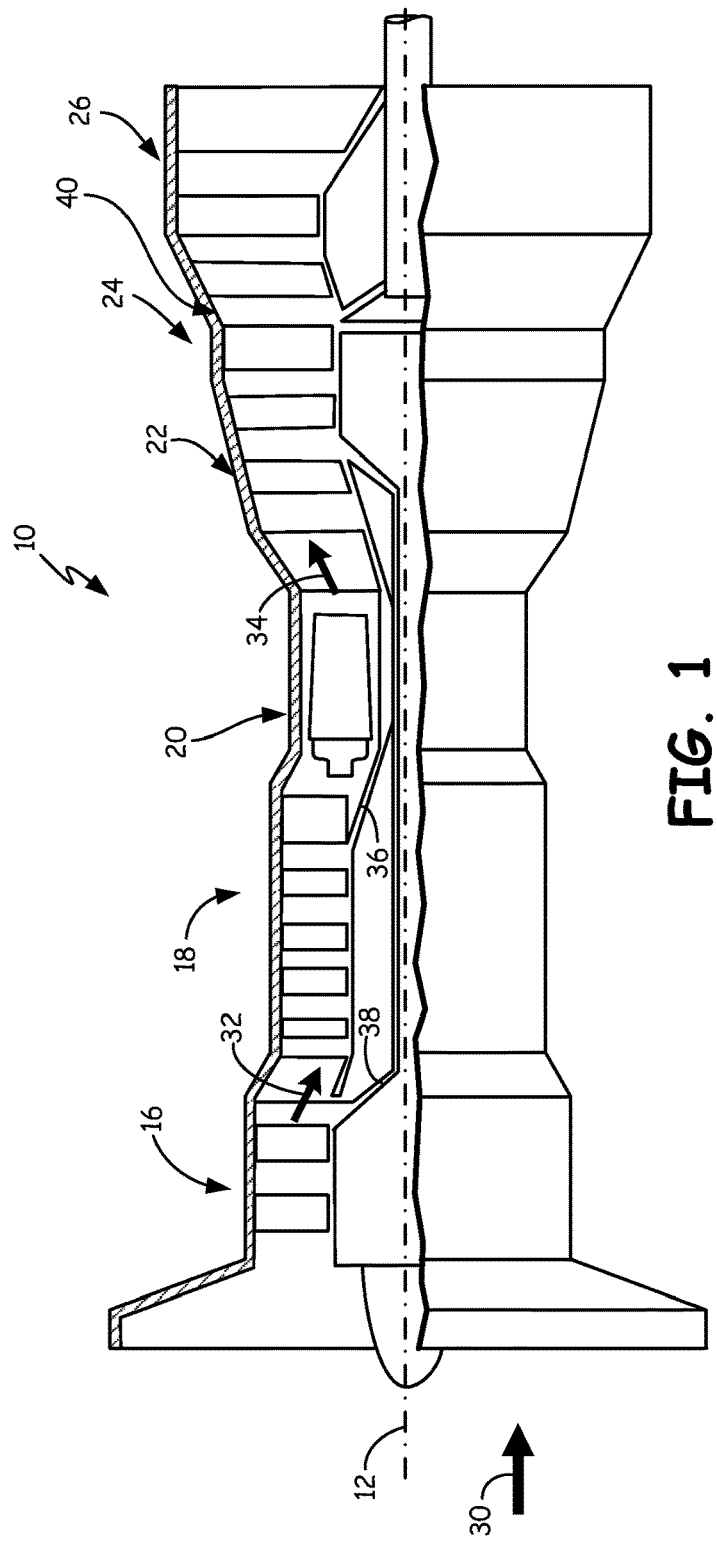
FIG. 1 is a side sectional schematic view of an industrial gas turbine engine having a turbine exhaust case of the present invention.

FIG. 1 is a side partial sectional schematic view of gas turbine engine 10. In the illustrated embodiment, gas turbine engine 10 is an industrial gas turbine engine circumferentially disposed about a central, longitudinal axis or axial engine centerline axis 12 as illustrated in FIG. 1. Gas turbine engine 10 includes, in series order from front to rear, low pressure compressor section 16, high pressure compressor section 18, combustor section 20, high pressure turbine section 22, and low pressure turbine section 24. In some embodiments, power turbine section 26 is a free turbine section disposed aft of the low pressure turbine 24.

As is well known in the art of gas turbines, incoming ambient air 30 becomes pressurized air 32 in the low and high pressure compressors 16 and 18. Fuel mixes with pressurized air 32 in combustor section 20, where it is burned. Once burned, combustion gases 34 expand through high and low pressure turbine sections 22, 24 and through power turbine section 26. High and low pressure turbine sections 22 and 24 drive high and low pressure rotor shafts 36 and 38 respectively, which rotate in response to the combustion products and thus rotate the attached high and low pressure compressor sections 18 and 16. Power turbine section 26 may, for example, drive an electrical generator, pump, or gearbox (not shown).

Low Pressure Turbine Exhaust Case (LPTEC) 40 is positioned between low pressure turbine section 24 and power turbine section 26. LPTEC 40 defines a flow path for gas exhausted from low pressure turbine section 24 that is conveyed to power turbine 26. LPTEC 40 also provides structural support for gas turbine engine 10.

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications. Similarly, although the present disclosure is described with reference to an LPTEC, the present invention is applicable to other components of gas turbine engines, such as intermediate cases, mid-turbine frames and the like.

Figure 2A:
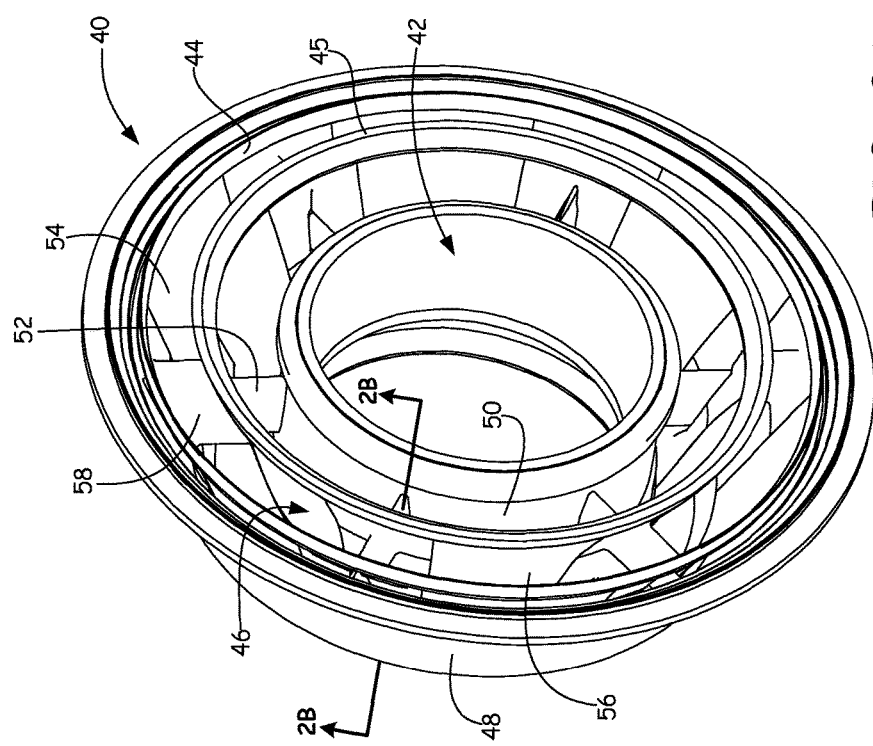
FIG. 2A is a perspective view of a turbine exhaust case in which a ring-strut-ring fairing is assembled within a ring-strut-ring frame.

FIG. 2A shows an exploded view of Low Pressure Turbine Exhaust Case (LPTEC) 40. LPTEC 40 includes frame 42, outer load ring 44, inner load ring 45, and fairing 46. Frame 42 includes outer ring 48, inner ring 50, and struts 52. Fairing 46 includes outer ring 54, inner ring 56, and vanes 58. As will be discussed subsequently, fairing 46 is fabricated as a plurality of pieces or segments (see FIG. 4) that are assembled in-place with frame 42, which is fabricated as a single-piece component.

Frame 42 comprises a stator component of gas turbine engine 10 (FIG. 1) that is typically mounted between low pressure turbine section 24 and power turbine section 26. In the described embodiment, outer ring 48 of frame 42 is conically shaped, while inner ring 50 is cylindrically shaped. In other embodiments, outer ring 48 and inner ring 50 may have other shapes. Inner ring 50 is disposed generally radially inward of outer ring 48 and is connected thereto by struts 52. Outer ring 48, inner ring 50 and struts 52 form a portion of a load path through engine 10 (FIG. 1). Frame 42 is sometimes referred to as a "cold frame" because fairing 46 shields frame 42 from heat of combustion gases 34.

Fairing 46 is adapted to be disposed within frame 42 between outer ring 48 and inner ring 50. Specifically, vanes 58 encase struts 52, while outer ring 54 and inner ring 56 line outer ring 48 and inner ring 50, respectively. In the described embodiment, outer ring 54 and inner ring 56 of fairing 46 have generally conical shapes, and are connected to each other by vanes 58. In other embodiments, outer ring 54 and inner ring 56 may have other shapes. Outer ring 54, inner ring 56, and vanes 58, define a portion of a gas flow path that passes through frame 42.

Load rings 44 and 45 comprise full-hoop bands that are used to strengthen and assemble the individual components of fairing 46. Fairing 46 is connected to load rings 44 and 45 when assembled, and load ring 44 can be used to facilitate assembly with frame 42. Load ring 44 is attached to an axial aft end of outer ring 54. Likewise, load ring 45 is attached to an axial aft end of inner ring 56. Load rings 44 and 45 are used to, among other things, hold individual pieces comprising fairing 46 together as a sub-assembly to facilitate assembly of fairing 46 onto frame 42. Fairing 46 additionally includes leading edge load rings, as shown in FIG. 2B.

Figure 2B:
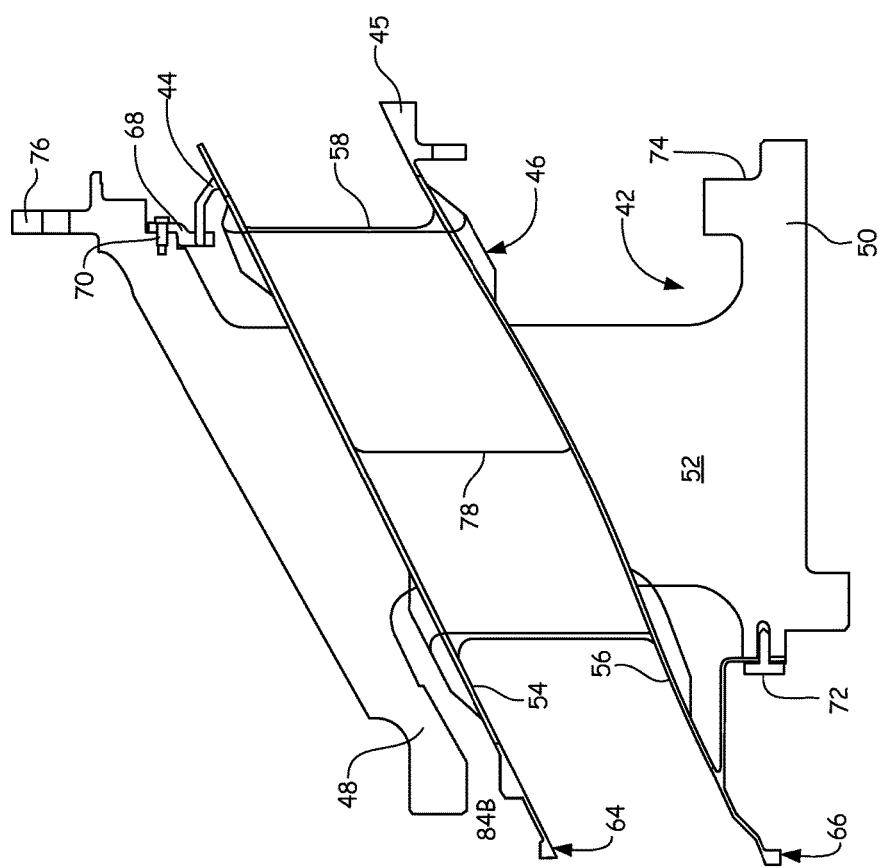
FIG. 2B is a cross-sectional view of the turbine exhaust case of FIG. 2A showing a strut of the frame extending through a strut of the fairing.

FIG. 2B shows a cross-section of LPTEC 40 having fairing 46 installed within frame 42. Frame 42 includes outer ring 48, inner ring 50 and strut 52. Fairing 46 includes outer ring 54, inner ring 56 and vanes 58. In addition to aft outer load ring 44 and aft inner load ring 45, LPTEC 40 also includes forward outer and inner load rings 64 and 66, annular mount 68, fasteners 70 and fasteners 72.

Frame 42 comprises a single piece, ring-strut-ring body wherein strut 52 is integrally connected to outer ring 48 and inner ring 50. As mentioned, a flow path for gas exiting gas turbine engine 10 (FIG. 1) passes between outer ring 48 and inner ring 50 within fairing 46. Frame 42 also includes other features, such as flange 74, flange 76 and bolt holes (not shown), to permit frame 42 to be mounted to components of gas turbine engine 10 (FIG. 1), such as low pressure turbine section 24, power turbine section 26 or an exhaust nozzle.

Fairing 46 comprises a thin-walled structure that lines the flow path through frame 42. Specifically, outer ring 54 and inner ring 56 define the boundaries of an annular flow path. Vanes 58 intermittently interrupt the annular flow path to protect struts 52 of frame 42. As such, vanes 58 can be aerodynamically shaped to minimize drag generated by vanes 58 or to turn flow of combustion gases 34 (FIG. 1) flowing through LPTEC 40. Fairing 46 is comprised of a plurality of components that, in the view of FIG. 2B, are joined at split line 78 to form a ring-strut-ring body that fits within the ring-strut-ring body of frame 42.

Figure 3:
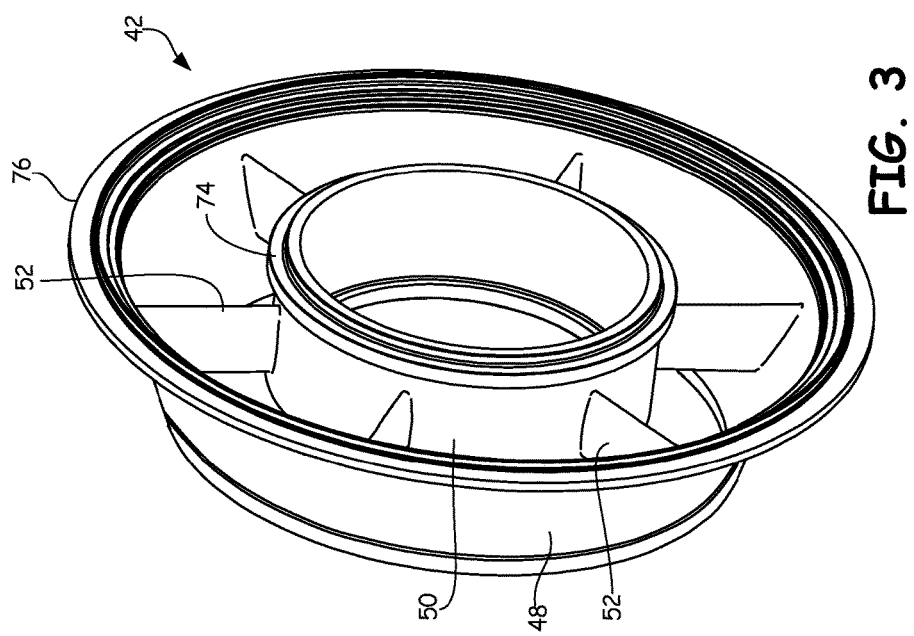
FIG. 3 is a perspective view of the ring-strut-ring frame of FIG. 2A showing the monolithic construction of the frame.

FIG. 3 is a perspective view of frame 42 of FIG. 2A. Frame 42 comprises a monolithic structure that joins outer ring 48, inner ring 50 and struts 52. In other words, frame 42 is of a single piece, unitary construction. In one embodiment, frame 42 is cast out of a high strength metal, such as nickel, titanium or steel. Frame 42 may, however, be machined from a unitary block. Struts 52 of frame 42 can be hollow and includes passages to permit components of gas turbine engine 10 to communicate with the interior of gas turbine engine 10 near shafts 36 and 38 (FIG. 1). For example, cooling air lines and lubricating oil lines can be passed through LPTEC 40 so as to cool bearings or other components of the engine. Outer ring 48 and inner ring 50 define annular load paths connected by struts 52. Fairing 46 is fitted into the flow path to protect frame 42 from the extreme temperatures of the hot gas flowing through LPTEC 40.

Figure 4:
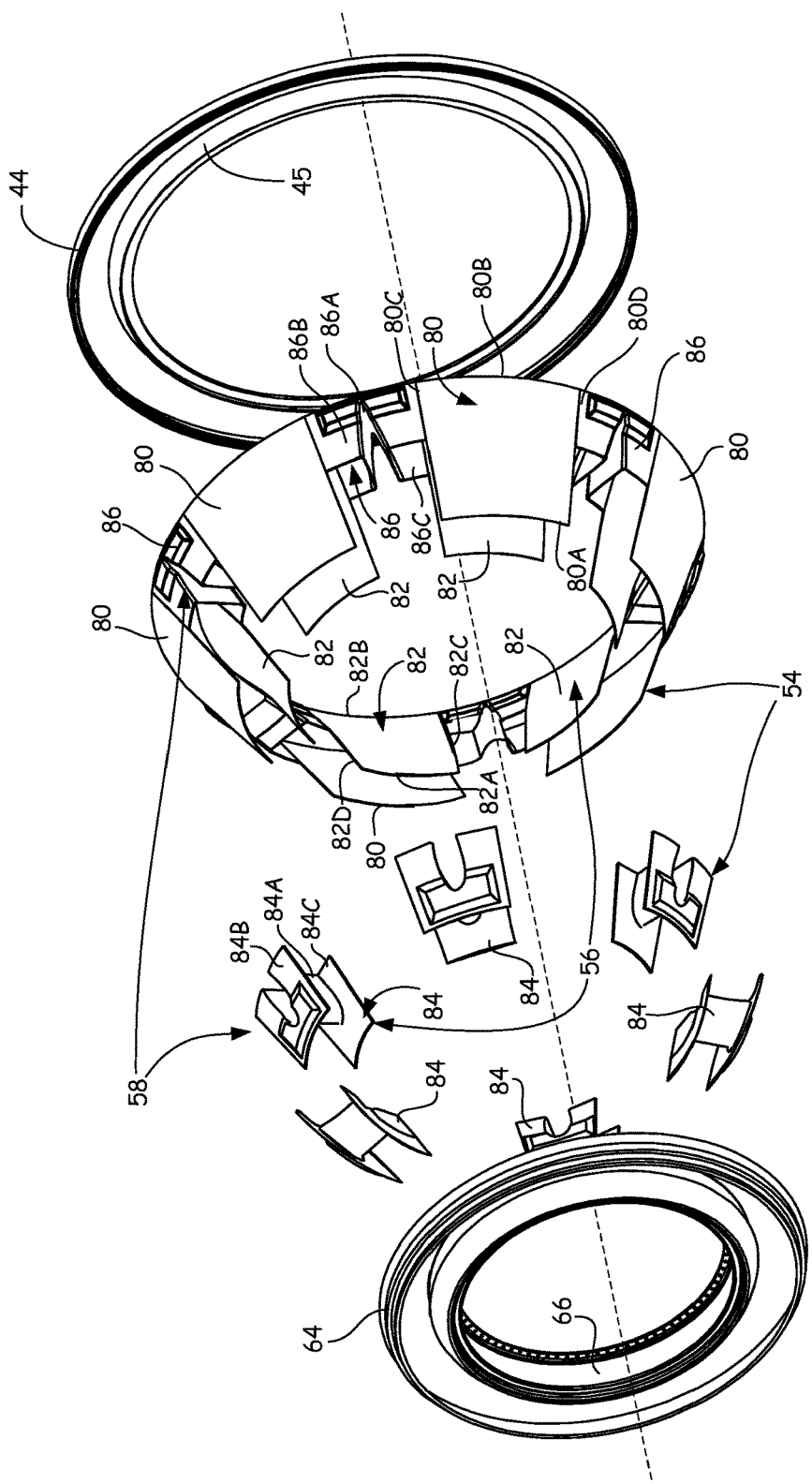
FIG. 4 is a partially exploded view of the ring-strut-ring fairing of FIG. 2A showing the multi-piece construction of the fairing.

FIG. 4 is a partially exploded view of fairing 46 of FIG. 2A. Fairing 46 includes outer ring 54, inner ring 56 and vanes 58 when assembled. Fairing 46 is comprised of thin-walled segments that can be manufactured using a variety of processes. For example, the segments of fairing 46 can be cast in their final shape or can be made as flat pieces that are bent or wrought into their final shape. When unassembled, fairing 46 is formed of outer segments 80, inner segments 82, forward strut segments 84 and aft strut segments 86. Outer segments 80 and inner segments 82 comprise rectilinear segments that are arcuate in the circumferential direction with respect to axis 12 of gas turbine engine 10 (FIG. 1). In other words, outer segments 80 and inner segments 82 comprise circumferential and axial segments of a cone. Specifically, each outer segment 80 comprises leading edge 80A, trailing edge 80B, first side 80C and second side 80D. Each inner segment 82 comprises leading edge 82A, trailing edge 82B, first side 82C and second side 82D. Similarly, forward strut segments 84 and aft strut segments 86 comprise strut halves that join adjacent pairs of shroud halves. Specifically, forward strut segment 84 comprises strut shell 84A, outer shroud half 84B and inner shroud half 84C. Similarly, aft strut segment 86 comprises strut shell 86A, outer shroud half 86B and inner shroud half 86C.

As will be discussed in greater detail later, aft load rings 44 and 45 connect outer segments 80, inner segments 82 and aft strut segments 86 to facilitate assembly of and to strengthen fairing 46 when fully assembled. Specifically, aft load rings 44 and 45, outer segments 80, inner segments 82 and aft strut segments 86 are joined together as a bench-made sub-assembly outside of frame 42 in order to facilitate accurate, efficient welding. Forward load rings 64 and 66 connect outer segments 80, inner segments 82 and forward strut segments 84 to facilitate assembly of and to strengthen fairing 46 when fully assembled. Specifically, forward load rings 64 and 66, outer segments 80, inner segments 82 and forward strut segments 84 are joined to the bench-made sub-assembly within frame 42 to complete the installation within LPTEC 40. Assembly of fairing 46 is described with reference to FIGS. 5A-8.

Figure 5A:
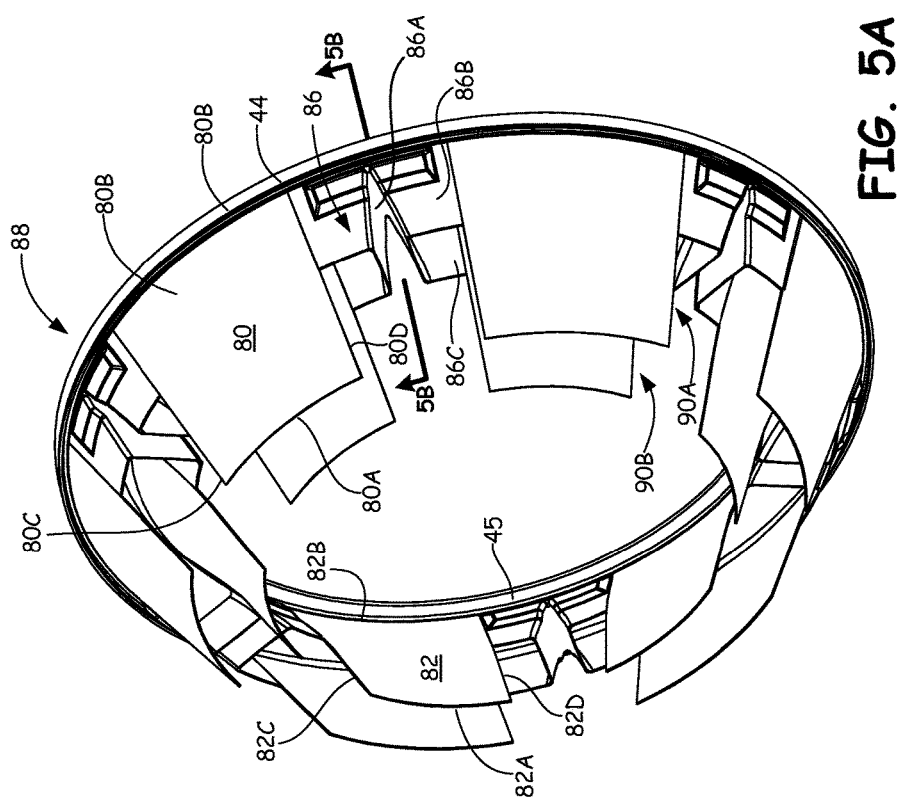
FIG. 5A is a perspective view of a fairing sub-assembly that can be inserted into the frame.
Figure 5B:
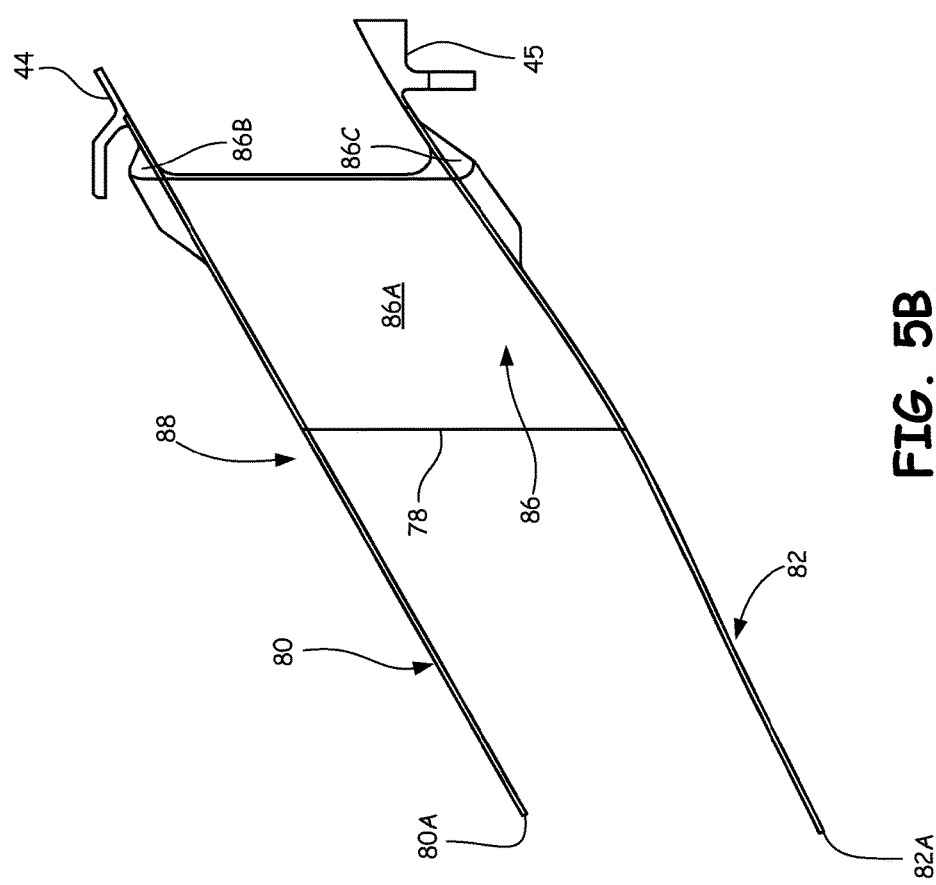
FIG. 5B is a cross-sectional view of the fairing sub-assembly of FIG. 5A.

FIG. 5A is a perspective view of fairing 46 partially assembled into aft sub-assembly 88. FIG. 5B, which is discussed concurrently with FIG. 5A, is a cross-sectional view of aft sub-assembly 88 of FIG. 5A. Aft sub-assembly 88 is built outside of frame 42 in a structured environment such that a high degree of control over the process used to join the individual components can be exerted. Specifically, aft sub-assembly 88 is put together in a fixture or on a bench to ensure precise alignment of the individual components, e.g. aft load rings 44 and 45, outer segments 80, inner segments 82 and aft strut segments 86. For example, the individual components can be clamped into place for welding, without having to work around the constraints of frame 42. Subsequently, precisely controlled welding processes can be used to join the individual components. In one embodiment, robotic welding arms can be used to join the individual components.

To assemble fairing 46, trailing edges 80B of outer segments 80 are joined to load ring 44 such that outer segments 80 are evenly spaced around the circumference of load ring 44. The space between neighboring outer segments 80 is approximately equal to the arc length of outer shroud half 86B of aft strut segments 86. Similarly, trailing edges 82B of inner segments 82 are joined to load ring 45. The space between neighboring inner segments 82 is approximately equal to the arc length of inner shroud half 86C. Aft strut segments 86 are positioned between neighboring outer segments 80 so that outer shroud half 86B can be joined to load ring 44. Likewise, aft strut segments 86 are positioned between neighboring inner segments 82 so that inner shroud half 86C can be joined to load ring 45. As will be discussed later, load rings 44 and 45 provide stiffening to fairing 46 when fully assembled, in addition to facilitating assembly as described here.

Load rings 44 and 45, outer segments 80, inner segments 82 and aft strut segments 86 can be assembled in any order. In one embodiment, outer segments 80 and outer shroud halves 86B are first joined to load ring 44. Outer shroud halves 86B and outer segments 80 are also joined to each other. Next, load ring 45 is joined to inner shroud halves 86C. Finally, inner segments 82 are joined to load ring 45 and inner shroud halves 86C. To provide the strongest structure, all mating faces are joined together using any suitable method. In one embodiment, the segments are welded together along the entire length of each mating face. In other embodiments, intermittent spot welds can be used. Assembled as such, outer segments 80, and aft strut segments 86 form slots 90A, and inner segments 82 and aft strut segments 86 form slots 90B. Slots 90A and 90B are configured to receive forward strut segments 84 (FIG. 4) after aft sub-assembly 88 is positioned within frame 42. The forward edges of aft strut segments 86 define split line 78, which mates with aft edges of forward strut segments 84.

Joining of the individual components, e.g. aft load rings 44 and 45, outer segments 80, inner segments 82 and aft strut segments 86, in a fixture or bench eliminates the need for aligning components by hand, which allows for increased control over tolerances and reduces misalignment in fairing 46 when fully assembled. Furthermore, automating the welding process reduces over-welding, which produces waste and can generate distortion. Additionally, aft sub-assembly 88 may be further processed, such as with heat treating, machining or bending, before being built around frame 42.

Figure 6:
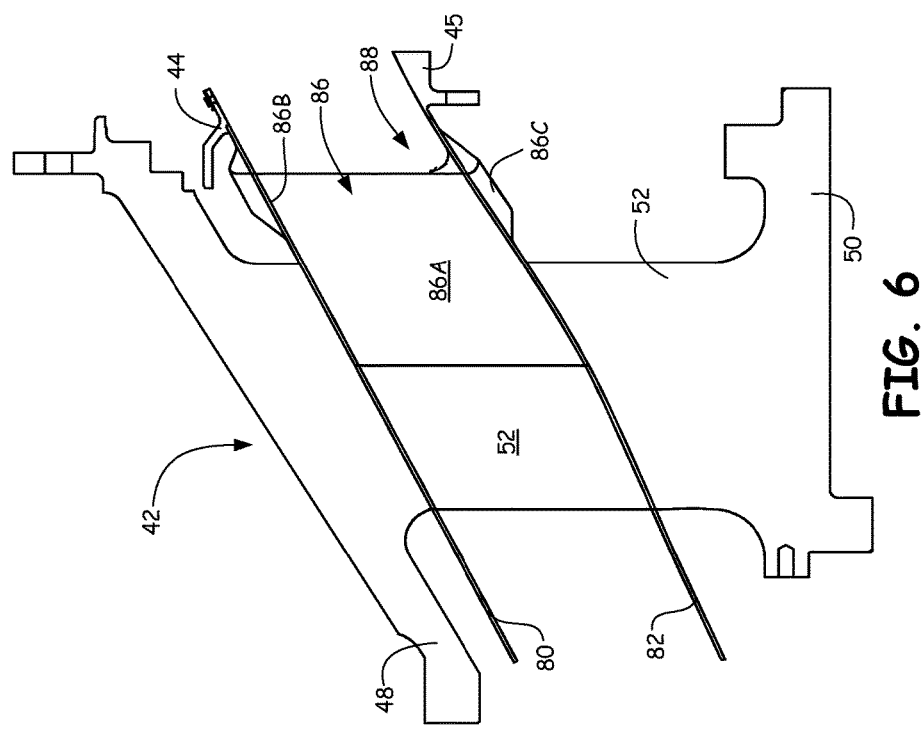
FIG. 6 is a cross-sectional view of the fairing sub-assembly of FIG. 5B inserted into the frame.

FIG. 6 is a cross-sectional view of aft sub-assembly 88 of FIG. 5B inserted into frame 42. Aft sub-assembly 88 is inserted into frame 42 from the trailing edge, or aft, end so that outer segment 80 is radially inward of outer ring 48 and inner segment 82 is radially outward of inner ring 50. Aft strut segment 86 partially surrounds strut 52. Specifically, aft strut shell 86A forms a U-shaped or V-shaped pocket that covers approximately the aft half of strut 52 in the embodiment disclosed. Aft sub-assembly 88 can be supported within frame 42 by any suitable means. In one embodiment, load ring 44 can be supported within outer ring 48 using annular mount 68 (FIG. 2B). However, it is desirable to not have aft sub-assembly 88 restricted to permit the segments of fairing 46 to be assembled without inducing any residual strain, such as strain that might arise during a welding process. With aft sub-assembly 88 inserted into frame 42, forward strut segments 84 (FIG. 4) can be brought into engagement with aft strut segments 86 to encapsulate portions of the lengths of struts 52.

Figure 7:
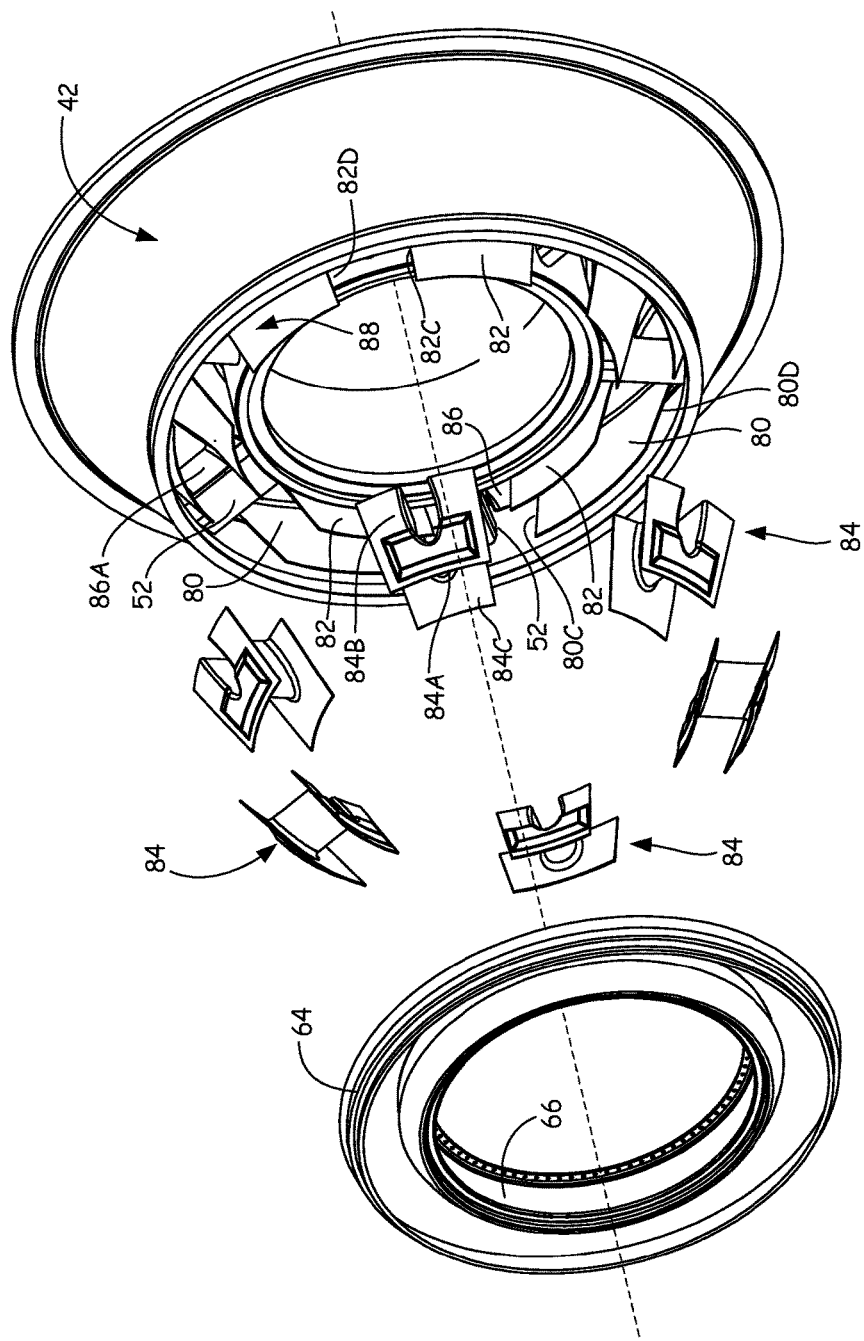
FIG. 7 is a front perspective view of the fairing sub-assembly inserted into the frame with unassembled fairing components exploded from the sub-assembly.

FIG. 7 is a front perspective view of aft sub-assembly 88 of fairing 46 inserted into frame 42 with forward strut segments 84 exploded from aft sub-assembly 88. Outer segments 80 and aft strut segments 86 form three-sided slots 90A (FIG. 5A) between edges 80C and 80D into which shroud half 84B of forward strut segments 84 can be inserted. Likewise, inner segments 82 and aft strut segments 86 form three-sided slots 90B (FIG. 5A) between edges 82C and 82D into which shroud half 84C of forward strut segments 84 can be inserted. Outer shroud halves 84B of forward strut segment 84 are inserted into slots 90A, and inner shroud halves 84C are inserted into slot 90B. Forward strut shell 84A is brought into engagement with aft strut shell 86A so that a shroud is formed around struts 52. Strut segments 84 are thereafter joined to aft sub-assembly 88.

As discussed above, strut segments 84 can be welded into place such that all mating faces are joined along their entire lengths. Forward strut segments 84 are hand assembled with and joined to aft sub-assembly 88. Slots 90A and 90B (FIG. 5A), however, are precisely produced with automated welding processes while aft sub-assembly 88 is held in place by a fixture. Slots 90A and 90B form a skeleton in which to easily align forward strut segments 84, thereby improving the quality of welds used for forward strut segments 84. Specifically, in one embodiment, forward strut segments 84 can be manually positioned within frame 42 to align with aft strut segments 86 and thereafter manually welded together due to the confined space limitations. For example, struts 52 of frame 42 may prevent complete freedom of the welding process, thereby making it difficult or impossible to position robotic welding arms. However, to the extent allowed by frame 42, automated welding processes may be used. In other embodiments, forward strut segments 84 may be fully welded by an automated process.

Load rings 64 and 66 are subsequently joined to aft sub-assembly 88 and forward strut segments 84. Specifically, outer load ring 64 is joined to outer segments 80 and outer shroud halves 84B of forward strut segments 84. Inner load ring 66 is joined to inner segments 82 and inner shroud halves 84C. Load rings 64 and 66 complete the assembly of fairing 46. Load rings 64 and 66 provide stiffening to fairing 46 similarly to that of load rings 44 and 45. Load rings 44, 45, 64 and 66 also provide structural points at which fairing 46 can be joined to frame 42. Load rings 64 and 66 are positioned and aligned with forward strut segments 84, outer segments 80 and inner segments 82 and thereafter welded together. In one embodiment, load rings 64 and 66 are manually positioned and welded. In another embodiment, load rings 64 and 66 are positioned in place with fixtures and welded with an automated process. Additionally, combinations of manual and automated processes may be used.

In one embodiment, the individual components of fairing 46 are fabricated from an alloy having a high temperature resistance, such as Inconel® 625 alloy, using a plasma welding process, and frame 42 is fabricated from CA6NM alloy, which has a relatively low temperature resistance. Fabrication of aft sub-assembly 88 (FIG. 5B) outside of frame 42 allows for better manufacturing of fairing 46, which provides better protection for frame 42 because the welds will be fully and properly formed. Further, aft sub-assembly 88 can be heat treated, if desired, outside of frame 42, which cannot be subjected to the temperatures needed to heat treat fairing 46.

Figure 8:
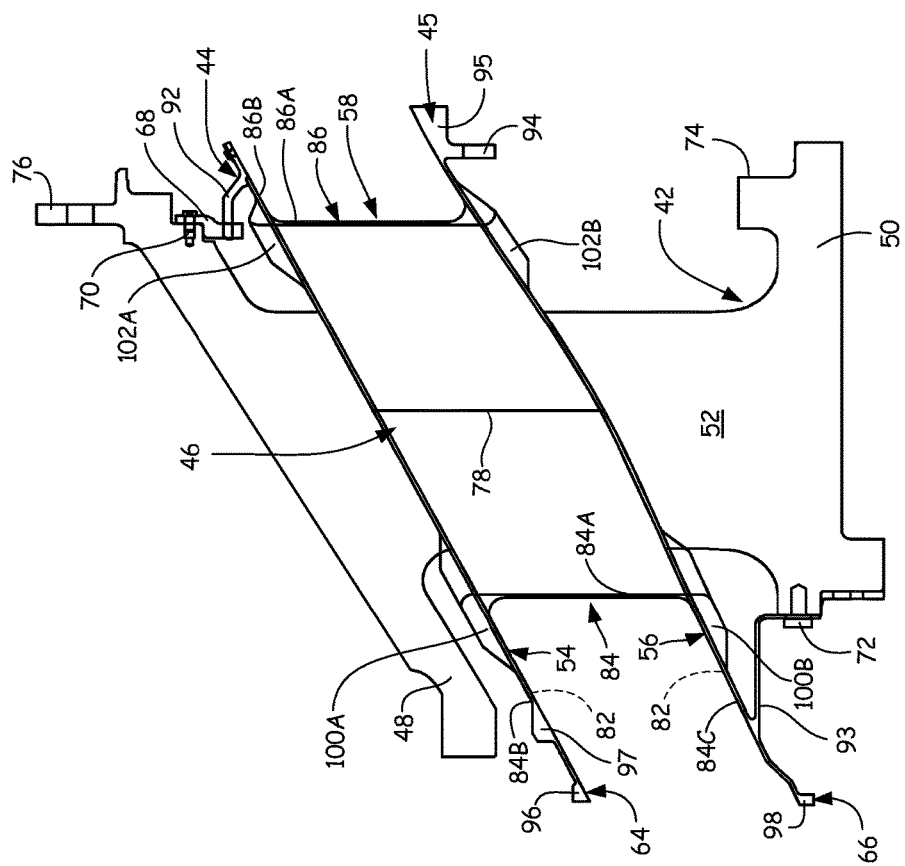
FIG. 8 is a cross-sectional view of the complete fairing assembled onto the frame showing the location of stiffening rings and pads on the fairing.

FIG. 8 is a cross-sectional view of completely assembled fairing 46 fitted into frame 42. FIG. 8 is the same view as FIG. 2A, with additional elements numbered. Fairing 46 includes load rings 44, 45, 64 and 66. Load ring 44 includes flange 92. Load ring 45 includes flange 94 and rim 95. Load ring 64 includes rim 96 and land 97. Load ring 65 includes rim 98. Forward strut segment 84 includes pads 100A and 100B. Aft strut segment 86 includes pads 102A and 102B.

Fairing 46 is joined to frame 42 at the interface of annular mount 68 and flange 92. For example, annular mount 68 can be bolted to outer ring 48, and flange 92 can be inserted into an opening in annular mount 68, thereby providing a free-floating connection or radial spline. Additionally, fairing 46 can be rigidly attached to frame 42 by fastening flange 93 of load ring 66 to inner ring 50 of frame 42 with fastener 72.

When completely assembled onto frame 42, fairing 46 is trapped in position such that fairing 46 cannot be non-destructively removed. That is, fairing 46 must be cut-away from frame 42 in order to separate the two components. Alternatively, frame 42 can be cut apart from fairing 46. Fairing 46 is thin-walled and can therefore be easily repaired by selectively removing portions of fairing 46 and replacing the portions with new material that can be joined to the existing structure. Fairing 46 is not subject to excessive loads within gas turbine engine 10 (FIG. 1) and can therefore withstand structural interruptions formed by assembly of the segments (80, 82, 84, 86) and subsequent repair procedures. Frame 42, however, remains as a single-piece or monolithic structure without inherent structural interruptions (e.g. joints or welds) in order to provide strength and stability to gas turbine engine 10 (FIG. 1).

Load rings 44, 45, 64 and 66 provide stiffening to the annuluses formed by the connection of aft sub-assembly 88 with forward strut segments 84. Outer segments 80, inner segments 82, outer shroud halves 86B, outer shroud halves 84B, inner shroud halves 86C and inner shroud halves 84C are generally formed of thin metal materials and, as such, have a tendency to deform when subjected to loading within gas turbine engine 10 (FIG. 1). Load rings 44, 45, 64 and 66 are joined to fairing 46 to strengthen outer ring 54 and inner ring 56 when fully assembled. Load rings 44, 45, 64 and 66 can be of any suitable cross-section, but are generally thicker than outer segments 80 and inner segments 82. More particularly, load rings 44, 45, 64 and 66 include features that are radially taller than outer segments 80 and inner segments 82 such that they provide more resistance to bending or loading in the circumferential and axial directions. Furthermore, load rings 44, 45, 64 and 66 comprise full-hoop bodies so that they do not include any structural interruptions, thereby providing stiffening to the annular shape formed by outer segments 80, inner segments 82, forward strut segments 84 and aft strut segments 86.

Load rings 44, 45, 64 and 66 include circumferential features for strengthening and stiffening the entirety of fairing 46. In particular, load ring 44 includes flange 92 which is thicker than outer shroud half 86B. Flange 92 may also be fashioned for assembling fairing 46 to frame 42 using annular mount 68. Load ring 45 includes flange 94, which increases the height of load ring 45 to provide additional resistance to deformation. Similarly, rim 95 comprises a thickening of load ring 45 that provides strength. Load ring 64 includes rim 96 and land 97, which both strengthen and stiffen load ring 64. Land 97 may also be used as a mating surface for seals used to seal between fairing 46 and frame 42. For example, land 97 may provide a flat planar, or cylindrical surface having an orientation that permits flush engagement with a seal. Load ring 64 includes rim 98, which strengthens and stiffens load ring 66. Flange 92, flange 94, rim 95, rim 96, land 97 and rim 98 comprise only a narrow portion of the axial length of their respective load ring. In other words, the entire axial length of rings 44, 45, 64 and 66 need not be radially thickened to provide stiffening. Flange 92, flange 94, rim 95, rim 96, land 97 and rim 98 comprise full three-hundred-sixty-degree features in the disclosed embodiment. However, in other embodiments, these stiffening features can be intermittent or interrupted around the circumferences of load rings 44, 45, 64 and 66.

Fairing 46 also includes pads 100A, 100B, 102A and 102B, which provide localized stiffening to fairing 46 in between load rings 44, 45, 64 and 66. Specifically, pads 100A-102B provide stiffening of forward and aft strut segments 84 and 86 near strut shells 84A and 86A. The intersection of strut shells 84A and 86A with inner and outer shroud halves 84B, 84C, 86B and 86C generate localized stress concentrations. Pads 100A-102B provide strengthening to shroud halves 84B, 84C, 86B and 86C to guard against creep, fatigue, and potential failure from the stress concentrations.

FIG. 9A is a perspective view of forward strut segment 84 showing outer shroud half 84A and pad 100A. FIG. 9B is a perspective view of forward strut segment 84 showing inner shroud half 84B and pad 100B. Pad 100A comprises a rectilinear outline having U-shaped cut-out 104A to accommodate strut shell 84A. Likewise, pad 100B comprises a rectilinear outline having U-shaped cut-out 104B to accommodate the forward vane shape of strut shell 84A. U-shaped cut-outs 104A and 104B trace a portion of the outline of strut shell 84A to provide reinforcement along areas where stress concentrations occur. Although pads 100A and 100B are shown having a particular rectilinear configuration, pads 100A and 100B may have other geometries and shapes. For example, pads 100A and 100B may be circular or oval, may have rounded edges or may have curved surfaces. Aft strut segments 86 are similar in construction to forward strut segments described in FIGS. 9A and 98B, with the main difference being that they include V-shaped cut-out more closely approximating the aft end of a vane shape.

Top surfaces 106A and 106B are generally concentric with outer shroud half 84B and inner shroud half 84C, respectively, so as to avoid producing stress concentrations. Specifically, top surfaces 106A and 106B are uniformly spaced from shroud halves 84A and 84B to provide hoop segments that strengthen strut segments 84 in the circumferential direction. Side surfaces of pads 100A and 100B, such as surfaces 108A and 108B, are obliquely angled with respect to surfaces 106A and 106B, and shroud halves 84B and 84C to avoid sharp angles that may produce stress concentrations.

In the embodiment shown, pads 100A and 100B do not encompass the entirety of shroud halves 84B and 84C so as to not add unnecessary weight to fairing 46. Pads 100A and 100B can, however, be extended to the edges of shroud halves 84A and 84B in other embodiments to provide additional stiffening and strengthening. Likewise, pads 100A and 100B may extend further around the outline of strut shell 84A to further strengthen the joint between strut shell 84A and shroud halves 84B and 84C in other embodiments. Pads 102A and 102B of aft strut segment 86 (FIG. 8) are constructed similarly to pads 100A and 100B.

Discussion of Possible Embodiments

The following are non-exclusive descriptions of possible embodiments of the present invention:

A fairing sub-assembly for a turbine frame comprising: an inner ring formed of a plurality of inner segments; an outer ring formed of a plurality of outer segments; and a plurality of strut-shells connecting the inner ring and the outer ring.

The fairing sub-assembly of the preceding paragraph can optionally include, additionally and/or alternatively, any one or more of the following features, configurations and/or additional components:

An inner band joining the plurality of inner segments and the plurality of strut-shells; and an outer band joining the plurality of outer segments and the plurality of strut-shells.

A plurality of inner segments, the plurality of outer segments, the plurality of strut-shells, the inner band and the outer band are fully welded along all mating interfaces.

Strut-shells joined to adjacent outer segments to form an outer slot in the outer ring; and strut-shells joined to adjacent inner segments to form an inner slot in the inner ring.

Inner segments comprising arcuate rectilinear panels; and outer segments comprising arcuate rectilinear panels.

Outer segments comprising circumferential and axial segments of a cone; and inner segments comprising circumferential and axial segments of a cone.

Strut-shells comprising: an aft portion of an aerodynamic vane.

Strut-shells comprising: a sheet metal body forming a U-shaped or V-shaped pocket.

Strut-shells comprising: an outer diameter shroud segment; and an inner diameter shroud segment.

Outer diameter shroud segments and each inner diameter shroud segments having an axial length that is shorter than those of the plurality of inner segments and the plurality of outer segments.

Outer diameter shroud segment joined to adjacent outer segments to form an outer slot; and each inner diameter shroud segment is joined to adjacent inner segments to form an inner slot.

Inner bands joining the inner diameter shroud segments and the plurality of inner segments; and outer bands joining the outer diameter shroud segments and the plurality of outer segments.

A method of assembling a fairing for a turbine frame comprising: joining a plurality of inner shroud segments to outer portions of a plurality of strut shells; and joining a plurality of outer shroud segments to inner portions of the plurality of strut shells.

The method of the preceding paragraph can optionally include, additionally and/or alternatively, any one or more of the following features, steps, configurations and/or additional components:

Joining the plurality of inner shroud segments to an inner band; joining the plurality of outer shroud segments to an outer band; and joining the plurality of strut shells to the inner and outer bands.

Welding the inner shroud segments, the outer shroud segments, the strut shells, the inner band and the outer band along all mating edges.

Joining the plurality of strut shells to the inner and outer bands between adjacent inner shroud segments and adjacent outer shroud segments.

Positioning the plurality of strut shells between adjacent outer shroud segments to form outer slots; and positioning the plurality of strut shells between adjacent inner shroud segments to form inner slots.

Positioning the fairing sub-assembly within a turbine frame such that the strut shells partially enshroud a frame strut.

A plurality of strut shells comprising aft strut shells; and a fairing sub-assembly that is inserted into an aft end of the turbine frame.

Positioning a plurality of forward strut shells within outer and inner slots such that the forward strut shells and the aft strut shells encircle the frame struts; and joining the plurality of forward strut shells to the fairing sub assembly.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fairing sub-assembly for a turbine frame, the fairing sub-assembly comprising:
   a plurality of inner arcuate segments distributed circumferentially along an inner ring, each inner arcuate segment comprising a discrete piece circumferentially separated from adjacent arcuate inner segments;
   a plurality of outer arcuate segments distributed circumferentially along an outer ring, each outer arcuate segment comprising a discrete piece circumferentially separated from adjacent arcuate outer segments; and
   a plurality of strut-shells connecting and completing the inner ring and the outer ring, each strut-shell comprising:
      a metal body forming a U-shaped or V-shaped pocket;
      an outer diameter strut shroud segment connected to the metal body, and extending circumferentially in an arcuate section; and
      an inner diameter strut shroud segment connected to the metal body opposite the outer diameter strut shroud segment, and extending circumferentially in an arcuate section;
   wherein each of the plurality of strut-shells has a circumferential extent not overlapping with the inner and outer arcuate segments, and is joined to adjacent inner and outer arcuate segments by axially-extending welds.

2. The fairing sub-assembly of claim 1 and further comprising:
an inner band joining the plurality of inner arcuate segments and the inner diameter strut shroud segments of the plurality of strut-shells; and
an outer band joining the plurality of outer arcuate segments and the outer diameter strut shroud segments of the plurality of strut-shells.

3. The fairing sub-assembly of claim 2 wherein the plurality of inner arcuate segments, the plurality of outer arcuate segments, the plurality of strut-shells, the inner band and the outer band are fully welded along all mating interfaces.

4. The fairing sub-assembly of claim 1 wherein:
each strut-shell is joined to adjacent outer arcuate segments to form an outer slot in the outer ring; and
each strut-shell is joined to adjacent inner arcuate segments to form an inner slot in the inner ring.

5. The fairing sub-assembly of claim 1 wherein:
each of the plurality of inner arcuate segments comprises an arcuate rectilinear panel; and
each of the plurality of outer arcuate segments comprises an arcuate rectilinear panel.

6. The fairing sub-assembly of claim 1 wherein:
each of the plurality of outer arcuate segments comprises a circumferential and axial segment of a cone; and
each of the plurality of inner arcuate segments comprises a circumferential and axial segment of a cone.

7. The fairing sub-assembly of claim 1 wherein each of the plurality of strut-shells forms an aft portion of an aerodynamic vane.

8. The fairing sub-assembly of claim 1, wherein the metal body is formed of sheet metal.

9. The fairing sub-assembly of claim 1 wherein each outer diameter strut shroud segment and each inner diameter strut shroud segment has an axial length that is shorter than those of the plurality of inner arcuate segments and the plurality of outer arcuate segments.

10. The fairing sub-assembly of claim 1 wherein:
each outer diameter strut shroud segment is joined to adjacent outer arcuate segments to form an outer slot; and
each inner diameter strut shroud segment is joined to adjacent inner arcuate segments to form an inner slot.

11. The fairing sub-assembly of claim 1 and further comprising:
an inner band joining the inner diameter strut shroud segments and the plurality of inner arcuate segments; and
an outer band joining the outer diameter strut shroud segments and the plurality of outer arcuate segments.

12. A method of assembling a fairing for a turbine frame, the method comprising:
casting a plurality of strut shells, each strut shell comprising a U-shaped or V-shaped pocket extending radially between outer and inner diameter shroud segments, wherein the outer and inner diameter shroud segments are arcuate, circumferentially extending elements;
welding a plurality of circumferentially separated inner arcuate sheet metal segments between circumferentially neighboring inner diameter shroud segments; and
joining a plurality of circumferentially separated outer arcuate sheet metal segments between circumferentially neighboring outer diameter shroud segments;
wherein each of the plurality of strut-shells has an angular circumferential extent not overlapping with the inner and outer arcuate sheet metal segments, such that the inner and outer arcuate sheet metal segments bridge circumferential gaps between each of the plurality of strut shells.

13. The method of claim 12 and further comprising:
joining the plurality of inner arcuate sheet metal segments to an inner band;
joining the plurality of outer arcuate sheet metal segments to an outer band; and
joining the plurality of strut shells to the inner and outer bands.

14. The method of claim 13 and further comprising:
welding the inner arcuate sheet metal segments, the outer arcuate sheet metal segments, the strut shells, the inner band and the outer band along all mating edges.

15. The method of claim 13 and further comprising:
joining the plurality of strut shells to the inner and outer bands between adjacent inner arcuate sheet metal segments and adjacent outer arcuate sheet metal segments.

16. The method of claim 15 and further comprising:
positioning the plurality of strut shells between adjacent outer arcuate sheet metal segments to form outer slots; and
positioning the plurality of strut shells between adjacent inner arcuate sheet metal segments to form inner slots.

17. The method of claim 16 and further comprising:
positioning the fairing sub-assembly within a turbine frame such that the strut shells partially enshroud a frame strut.

18. The method of claim 17 wherein:
the plurality of strut shells comprise aft strut shells; and
the fairing sub-assembly is inserted into an aft end of the turbine frame.

19. The method of claim 18 and further comprising:
positioning a plurality of forward strut shells within outer and inner slots such that the forward strut shells and the aft strut shells encircle the frame struts; and
joining the plurality of forward strut shells to the fairing sub assembly.

* * * * *